United States Patent [19]

Schmitt

[11] 4,423,749
[45] Jan. 3, 1984

[54] ANGLE COCK IMPROVEMENTS

[75] Inventor: Eugene W. Schmitt, Lockport, Ill.

[73] Assignee: Sloan Valve Company, Franklin Park, Ill.

[21] Appl. No.: 473,659

[22] Filed: Mar. 9, 1983

Related U.S. Application Data

[63] Continuation-in-part of Ser. No. 448,032, Dec. 8, 1982.

[51] Int. Cl.³ .............................................. F16K 5/06
[52] U.S. Cl. ................................. 137/315; 137/454.6; 251/315; 251/317
[58] Field of Search ................. 137/315, 454.2, 454.6; 251/99, 315, 316, 317

[56] References Cited

U.S. PATENT DOCUMENTS

| | | | |
|---|---|---|---|
| 3,066,909 | 12/1962 | Reed, Jr. ............................ | 251/309 |
| 3,437,106 | 4/1969 | Mueller et al. ..................... | 251/315 |
| 3,498,585 | 3/1970 | Temple et al. ...................... | 251/315 |
| 3,591,137 | 7/1971 | Billeter ............................... | 251/315 |
| 3,648,723 | 3/1972 | Nelson et al. ...................... | 251/317 |
| 3,671,010 | 6/1972 | Scaramucci ........................ | 251/315 |
| 3,726,317 | 4/1973 | Moen .................................. | 251/317 |
| 3,970,285 | 7/1976 | Lonn .................................. | 251/315 |
| 4,072,161 | 2/1978 | Schoeneweis et al. ............. | 251/315 |
| 4,099,543 | 7/1978 | Mong et al. ........................ | 251/315 |
| 4,109,673 | 8/1978 | Horowitz et al. .................. | 251/99 |
| 4,125,128 | 11/1978 | Elward et al. ..................... | 251/315 |

Primary Examiner—George L. Walton
Attorney, Agent, or Firm—Kinzer, Plyer, Dorn & McEachran

[57] ABSTRACT

A shutoff valve for use in a transportation environment has a body with an internal passage and means on the passage wall for attaching the body. There is a chamber in the body in communication with the passage and there is an opening in the body in alignment with the chamber. A seal member is positioned within the chamber and has openings therein in communication with the passage. The body opening is of a size and shape to permit positioning of the seal member within the chamber. There are cooperating means on the seal member and chamber walls fixing the seal within the chamber and preventing rotation of the seal relative to the body. The cooperating means on the seal include air vent openings. A ball member is positioned within and enclosed by the seal member with the ball member being rotatable to open and close the valve. The seal member has an opening slightly smaller than the ball member whereby the seal member is stretched to permit insertion of the ball member, but after such insertion retains the ball member therein. A handle extends through the body and into engagement with the ball member and there is a cover closing the body opening.

5 Claims, 9 Drawing Figures

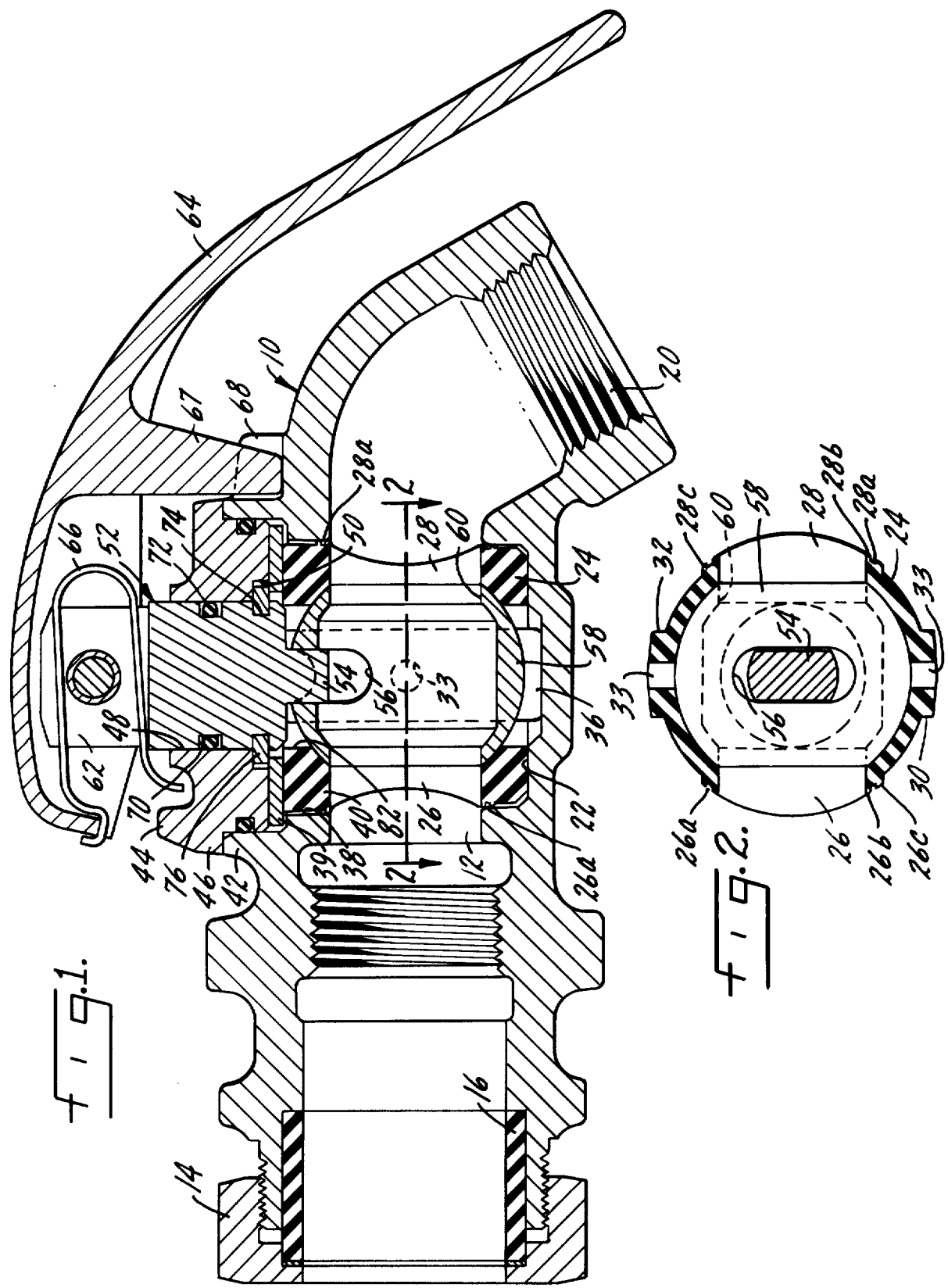

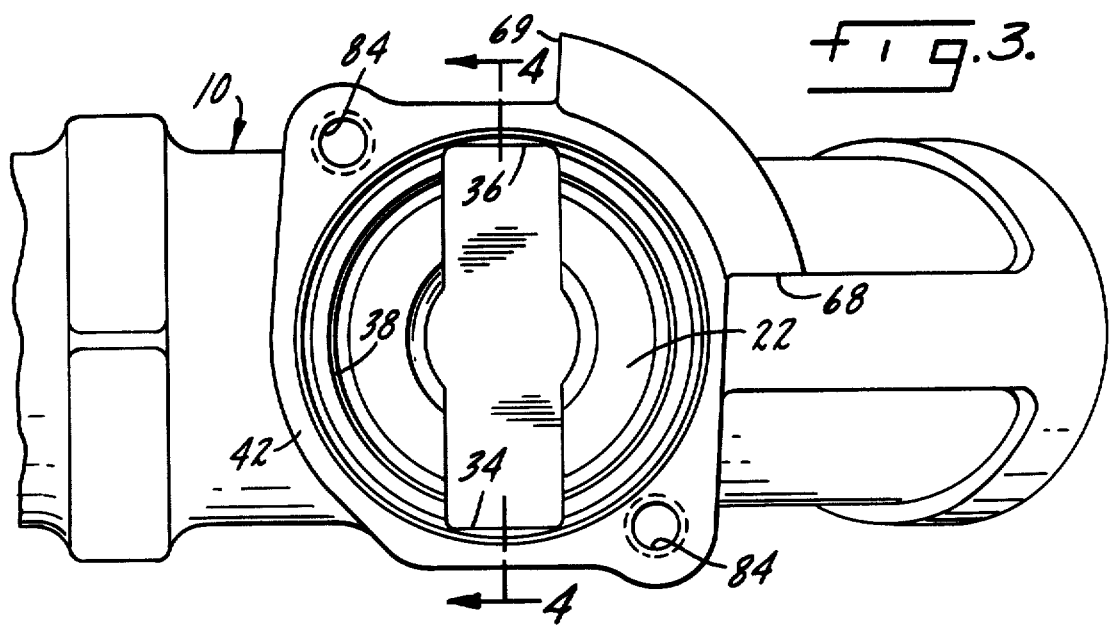
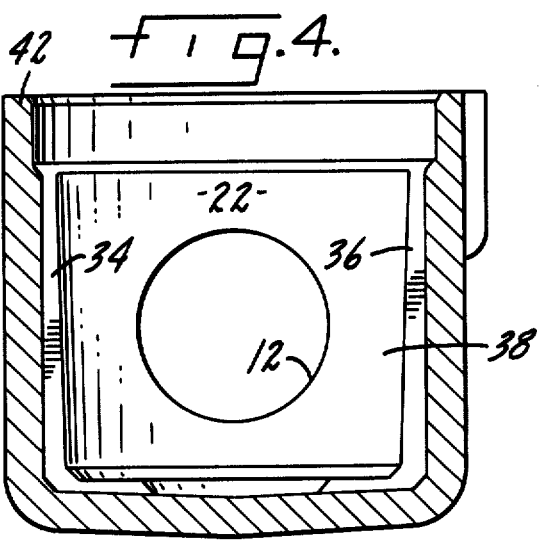
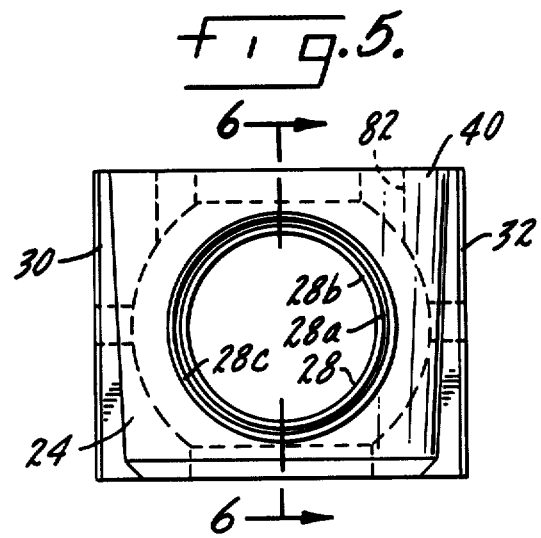
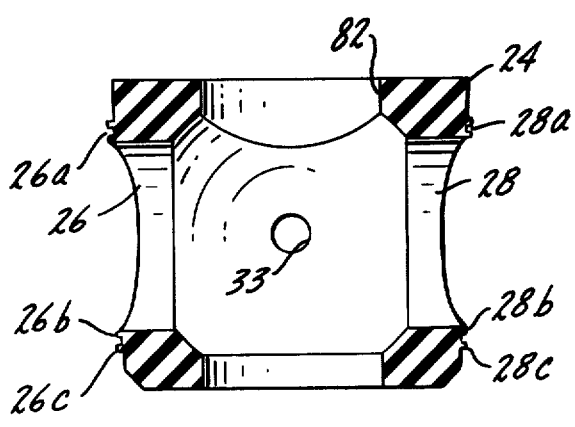
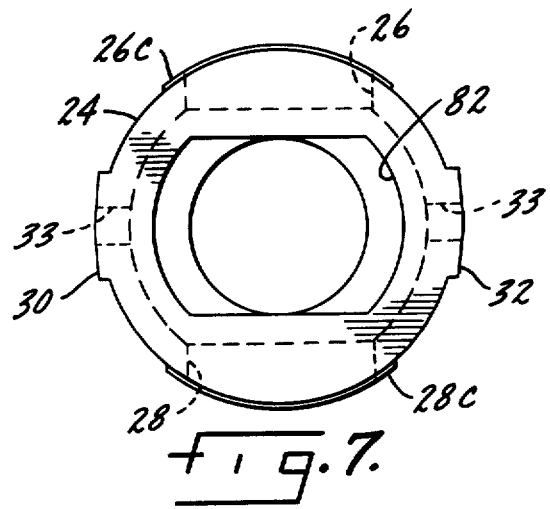

ANGLE COCK IMPROVEMENTS

SUMMARY OF THE INVENTION

This application is a continuation-in-part of application Ser. No. 448,032 filed Dec. 8, 1982.

The present invention relates to shutoff valves for use in a transportation environment and in particular to a valve having an improved seal.

A primary purpose of the invention is a railroad angle cock having a single seal member which encloses the ball-shaped valve member.

Another purpose is a valve of the type described including an improved relationship between the parts permitting easy insertion and retention of the seal and rotatable valve member.

Another purpose is a valve of the type described in which the handle for operating the valve member extends through a cover plate, with the means for retaining the handle and the cover plate together, permitting easy assembly and disassembly.

Another purpose is an improved valve member seal for use in a transportation gladhand.

Other purposes will appear in the ensuing specification, drawings and claims.

BRIEF DESCRIPTION OF THE DRAWINGS

The invention is illustrated diagrammatically in the following drawings wherein:

FIG. 1 is a vertical section through an angle cock,

FIG. 2 is a section along plane 2—2 of FIG. 1, with the body omitted,

FIG. 3 is a top plan view of the body member,

FIG. 4 is a section along plane 4—4 of FIG. 3,

FIG. 5 is a side view of the seal member,

FIG. 6 is a section along plane 6—6 of FIG. 5,

FIG. 7 is a top plan view of the seal member,

DESCRIPTION OF THE PREFERRED EMBODIMENT

Figure 8:
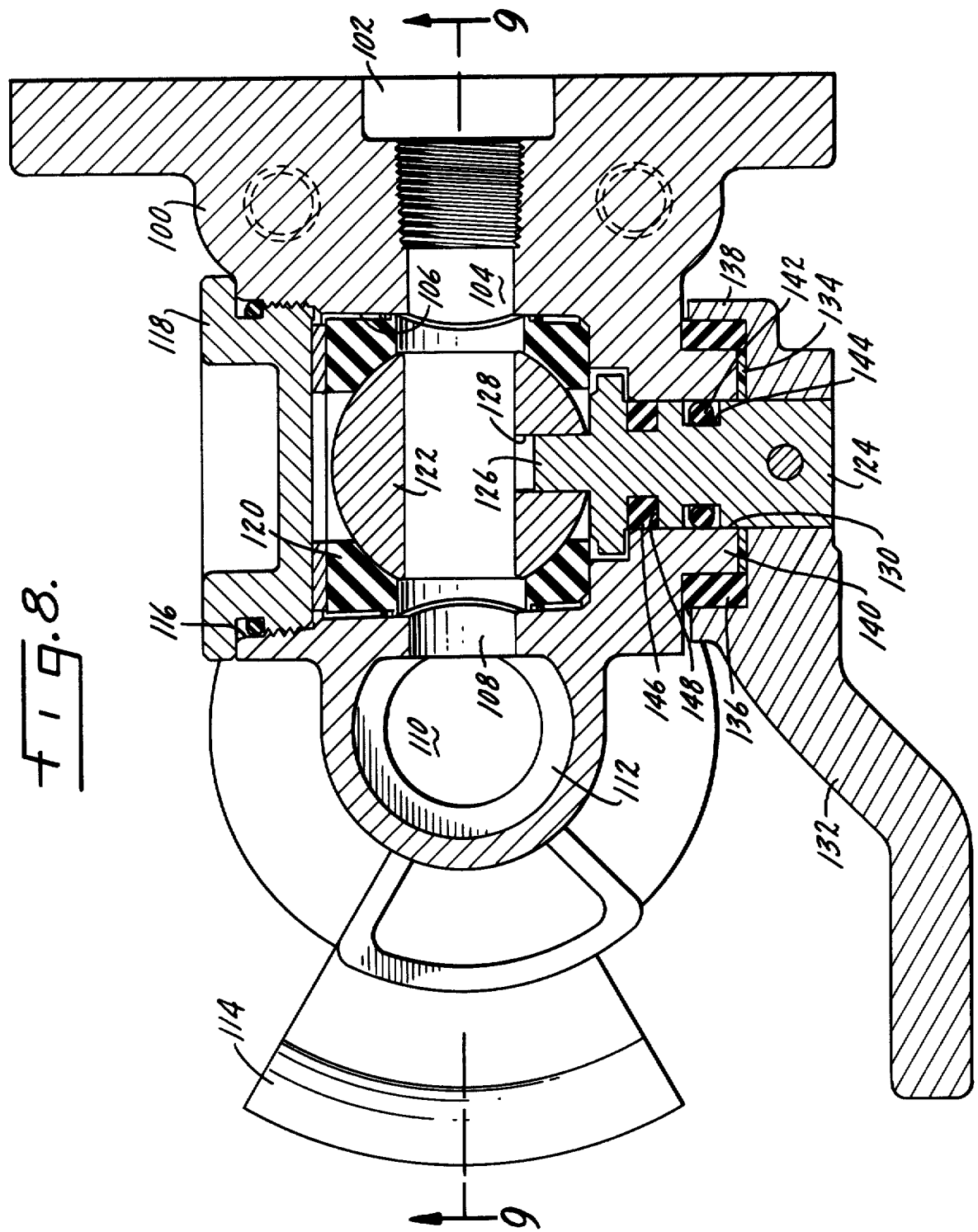
FIG. 8 is a section through a gladhand.

The valve of the present invention finds utility in the air brake system of railroad cars and over-the-road vehicles. In railroad use the angle cock is conventionally connected to the car brake pipe. In a road vehicle the valve is a part of the structure known as a gladhand. Of particular importance is the use of a single housing-like seal member to enclose the valve member. Further, the invention is directed to a unique assembly of parts whereby the handle and the cover plate for the valve body may be easily assembled and disassembled.

In the drawings, FIGS. 1-7 show the valve structure as an angle cock which includes a body 10 having an internal passage 12. A lock nut 14 is threadedly engaged with one end of body 10 and is used to connect the angle cock to the brake pipe of a conventional railroad car air brake system. Positioned directly adjacent lock nut 14 is a packing member 16. The packing is effective to seal the end of the brake pipe which will be held in position within the angle cock by lock nut 14.

The opposite end of angle cock body 10 similarly has an internal threaded area 20 for use in connecting the angle cock to a further portion of the railroad car air brake system.

Intermediate the opposite ends of passage 12 in body 10 is a chamber 22 within which is positioned a seal member 24. Seal member 24 is in the shape of a housing or a cage and is a unitary seal member which contains or encloses the operating member of the angle cock. Typically, the seal member, which is flexible and elastic, is formed of a suitable rubber or rubberlike material. The seal member may have oppositely positioned openings 26 and 28 which are in alignment with passage 12, thereby providing communication with the passage and the ball member positioned within the seal. Directly adjacent and surrounding openings 26 and 28 the seal includes small peripheral grooves 26a and 28a. The grooves provide adjacent but spaced thin sealing beads 26b, 26c and 28b, 28c. The beads are important in providing a positive seal with the body, particularly at low temperatures. A seal at this point requires compression and distortion of rubber. The use of a groove creates thin seal beads which in turn are more distortable under pressure. The sides of seal member 24 at 90 degrees to passages 26 and 28, as particularly shown in FIG. 7, have lugs 30 and 32 extending into mating internal grooves 34 and 36 on the sides of chamber 22, thereby fixing the seal member in position within the chamber. Thus, when the ball member, to be described hereinafter, is rotated during operation of the angle cock, the seal will be retained in the position of FIG. 1. Lugs 30 and 32 each have an air passage 33 for equalizing pressure when the angle cock is in the off position. Without such vent passages, the seal may balloon into the ball openings, disengaging the seal lugs from the body and permitting the seal to rotate with the ball.

Body 10 has an opening 38 which is of a size and shape to accomodate the upper portion of seal member 24, designated at 40, with seal member portion 40 substantially filling and sealingly closing the opening when the seal member is positioned within chamber 22 of body 10. Surrounding opening 38 is an upstanding flange 42 which positions a cover plate 44 above opening 38. A washer 39 is positioned between the cover plate and the top of the seal member. Cover plate 44 has an outwardly extending shoulder 46 which overlies and seats upon the top of flange 42, thus forming a complete closure for the opening in the body. Cover plate 44 has an internal bore 48 with an enlarged lower portion 50, as will be described in more detail hereinafter.

Positioned within bore 48 of cover plate 44 is a handle stem 52 which has an operating stem portion 54 positioned within a mating socket 56 in the top of ball member 58 contained within seal member 24. Rotation of handle 52 is effective to rotate ball member 58 and to place its internal passage 60 either in alignment with seal passages 26 and 28, and thus passage 12, to open the angle cock or at a position 90 degrees to that described whereby the angle cock is closed. When in the closed position, passage 60 in the ball member is positioned in contact with the walls of seal member 24, thereby closing passage 12 through the angle cock.

The exterior end of handle 52 has an outwardly extending bifurcated stem 62 which pivotally mounts a handle member 64 in a conventional manner. A spring 66 interconnects stem 62 and the handle member. Handle member 64 has a lug 67 which is positioned against a stop member 68 on body 10 adjacent upstanding flange 42, which stop normally holds handle member 64 against rotation relative to the body member. When the angle cock is to be changed from one position to another, handle member 64 is raised, against the force of spring 66, to clear those portions of the body member adjacent stop 68, thus permitting the handle member to rotate and the ball member to be moved from an open to a closed position or the reverse. There is a second locking stop 69 on body flange 42 which is conventional.

Handle 52 has a groove 70 containing an O-ring 72 which forms a seal between the handle and the surrounding cover plate bore. Directly beneath or interior of groove 70 there is a groove 74 in the handle, which groove positions and holds a split locking ring 76. The locking ring is positioned in the enlarged portion 50 of cover plate bore 48. Thus, the handle is retained against inward or outward movement as to the cover plate by split locking ring 76 and washer 39, with the handle being rotatable relative to the cover plate to rotate ball member 58 between the open and closed positions.

In assembly of the angle cock, first handle 52 is positioned within bore 48 of the cover plate. Split locking ring 76 is positioned within groove 74 in the handle and the handle is then moved upwardly within cover plate bore 48 until the locking ring bottoms against the shoulder formed by the enlarged portion of the cover plate bore. The handle-cover plate combination is then positioned on and fastened to the valve body. In disassembly, the handle-cover plate combination is first removed and then the handle is moved to expose split locking ring 76 which can then be removed. The handle can then be removed to expose O-ring 72. The assembly and disassembly process is advantageous in that it does not require removal of handle member 64 from handle 52.

Prior to positioning the cover plate above opening 38 in body 10, ball member 58 is positioned within seal 24. The top of the seal has an opening 82 which is slightly smaller than the cross section of the ball member. However, the ball member can be inserted through the opening which has a tendency to stretch the seal. After insertion, the ball member will be enclosed and retained and confined within the seal. The combination of the seal and ball member is then inserted through opening 38 in body 10 until the seal is firmly seated and positioned within chamber 22. The combination of handle 52 and cover plate 44 is then positioned on top of the seal covering opening 38 in body 10. The cover plate will then be attached by suitable screws or the like in holes 84 on the body 10 to thus retain the entire structure in an assembled state.

Of importance is the use of a unitary seal which is used to close the angle cock and functions to mount and position the angle cock valve member 58. The seal is held against rotation by cooperating lugs and grooves 30, 32, 34 and 36. Each of the lugs has a vent passage which prevents disengagement of the seal lugs and the body mating grooves when there is external pressure on the seal during valve closure. The assembly and disassembly of the handle and cover plate is accomplished without removing handle member 64 from its pivotal mounting on handle 58.

Figure 9:
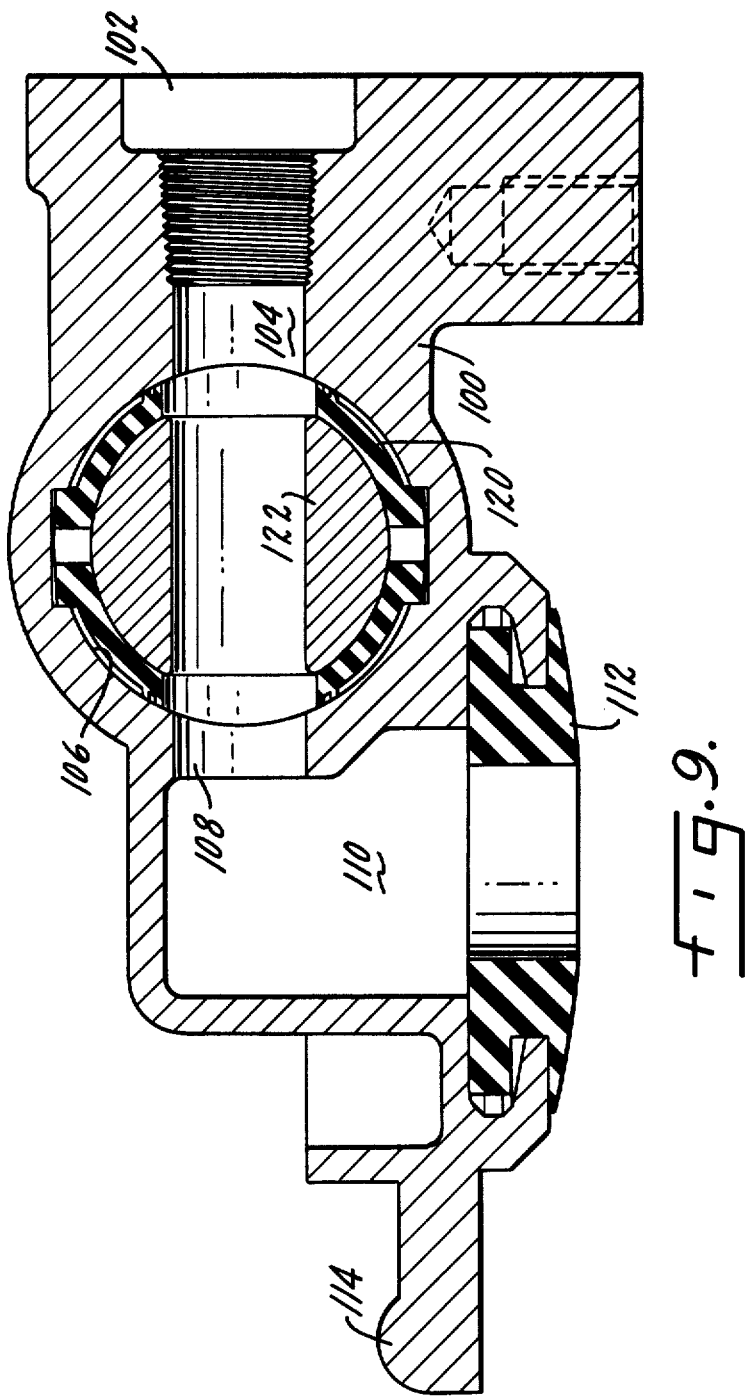
FIG. 9 is a section along plane 9—9 of FIG. 8.

FIGS. 8, 9 and 10 illustrate the use of the seal shown in FIGS. 1-7 in a gladhand of the type customarily found on over-the-road vehicles such as tractors and/or trailers. A gladhand body is indicated at 100 and has an air port 102 opening into a passage 104. Passage 104 is in communication with a chamber 106. There is a second passage 108 also in communication with chamber 106, with passage 108 communicating with an additional chamber 110, the termination of which mounts a gladhand seal 112. Seal 112 is conventional and it should be understood that only a portion of the overall gladhand structure is shown. There is a mating housing part which closes upon seal 112 to define the complete gladhand structure. In this connection, there is an outwardly-extending flange 114 which will cooperate with a similar flange structure in order to join the two gladhand parts together. Body 100 has an opening 116 closed by a cover 118, with the cover forming one side of chamber 106.

Positioned within chamber 106 is a seal 120 similar or identical to seal member 24 illustrated in FIGS. 1-7. Accordingly, all of the various elements of the seal will not be re-described. Positioned within seal 120 is a ball member 122, again similar to the ball member in FIGS. 1-7.

A handle stem 124 has a projection 126 which is positioned within a slot 128 in ball member 122. Handle stem 124 extends outwardly through a restrictive opening 130 in the gladhand body 100 with a manual operating member 132 being attached thereto to effect rotation thereof.

One problem with current valve members which find utility in transportation environments, whether it be railroads or trucks, is that the valve is normally exteriorly mounted and therefore subject to all types of damaging elements and to all ranges of temperature, from the sub-zero environment of winter to an elevated temperature such as found in summer. At times, the metal-to-metal contact of parts of the valve become welded together by corrosion. Accordingly, there is positioned between the opposing surfaces of body 100 and operating member 132 a non-metallic washer 134 which may be formed of Teflon or some other suitable wear resistant element. Washer 134 prevents corrosion and sticking and/or welding of the facing metal parts of the body and manual operating member. Accordingly, the valve will have no restrictions on its rotation due to its environment. There is further a seal-like element 136 which surrounds boss 140 of body 100 which mounts operating member 132 and is positioned between a flange 138 of operating member 132 and boss 140. Seal element 136 may be termed a filter or a seal and may be formed or a rubber or rubberlike material or of a felt-type material. In addition to sealing, element 136 performs a filtering function in that it prevents dirt or other foreign elements from attacking the interior of the valve member and any interior seals.

Positioned between handle stem 124 and body 100 is a seal member 142 which is located within a groove 144 on the exterior of stem 124. Seal member 142 is protected from exterior elements by seal or filter 136. An additional seal or filter element, indicated at 146, may be positioned within a groove 148 in handle 124 and bears or seals against a portion of body 100. Seal 146 prevents the air from within the valve structure from reaching seal 142, thereby preventing the seal from drying or losing its lubricant because of the constant application of dry air.

Although ball member 122 is firmly held within seal member 120, there may be a slight shifting of the ball member, permitted by tolerances between projection 126 and groove 128, which shifting is brought about by the application of air pressure, when the valve is closed. The air pressure will push against the ball member, thereby forcing it into a compression seal at the opposite side of the valve structure.

Whereas the preferred form of the invention has been shown and described herein, it should be realized that there may be many modifications, substitutions and alterations thereto.

The embodiments of the invention in which an exclusive property or privilege is claimed are defined as follows:

1. In a shutoff valve for use in a transportation environment, a body having an internal passage, a chamber in said body in communication with said passage, an opening in said body in alignment with said chamber, a flexible seal member in the form of a housing positioned within said chamber and having openings therein in communication with said passage, said body opening being of a size and shape to permit movement of said seal member therethrough into position within said chamber opposite sides of said seal member having outwardly-extending lugs which mate with correspondingly-shaped and sized grooves on the inside of said chamber to prevent movement of said seal member within said chamber, air vent holes in said lugs preventing disengagement of the seal lugs from the body when the valve is closed, said seal member having peripheral bead-like sealing areas surrounding said seal member openings, said bead-like sealing areas being in sealing engagement with said chamber and each including, at each opening, a bead directly adjacent said opening, an adjacent groove, and a second bead, with said groove separating said peripheral beads, a ball member positioned within and enclosed by said housing-like seal member, said ball member being rotatable to open and close said valve, said seal member having an opening therein slightly smaller than said ball member whereby said seal member is stretched to permit insertion of said ball member, but after insertion, said seal member confines said ball member therein, a handle extending through said body and into engagement with said ball member, and a cover plate closing said body opening, with said handle permitting external operation to open and close said valve.

2. The valve of claim 1 further characterized in that said handle extends through said cover plate, with said cover plate having a bore of a size and shape to receive said handle, one end of said cover plate bore having an enlargement, and lock ring means positioned within said enlargement and extending into a mating groove on the exterior of said handle.

3. The valve of claim 1 further characterized by and including an additional opening in said body, with said handle extending through said additional opening, and a non-metallic bearing member between said handle and body positioned about said additional opening.

4. The valve of claim 1 further characterized by and including filtering means positioned between said handle and body to prevent foreign matter from exterior of said valve reaching the interior thereof.

5. The valve of claim 1 further characterized by and including a seal between said handle and body and a second seal positioned between said body and handle interior of said first seal to prevent interior air from reaching said first seal.

* * * * *